United States Patent
Korus et al.

(10) Patent No.: US 9,283,810 B2
(45) Date of Patent: Mar. 15, 2016

(54) WHEEL AND TIRE ASSEMBLY

(71) Applicant: Lindsay Corporation, Omaha, NE (US)

(72) Inventors: Thomas J. Korus, Lindsay, NE (US); Michael Fredenburg, Hickman, NE (US)

(73) Assignee: Lindsay Corporation, Omaha, NE (US)

( * ) Notice: Subject to any disclaimer, the term of this patent is extended or adjusted under 35 U.S.C. 154(b) by 466 days.

(21) Appl. No.: 13/654,691

(22) Filed: Oct. 18, 2012

(65) Prior Publication Data

US 2014/0110992 A1 Apr. 24, 2014

(51) Int. Cl.
| | |
|---|---|
| B60C 7/24 | (2006.01) |
| B60C 7/10 | (2006.01) |
| B60B 23/04 | (2006.01) |
| B60C 7/22 | (2006.01) |
| B60C 11/03 | (2006.01) |
| B60B 15/02 | (2006.01) |

(52) U.S. Cl.
CPC . *B60C 7/24* (2013.01); *B60B 23/04* (2013.01); *B60C 7/10* (2013.01); *B60C 7/22* (2013.01); *B60B 15/025* (2013.01); *B60C 11/0311* (2013.04); *Y10T 29/49492* (2015.01); *Y10T 29/49499* (2015.01)

(58) Field of Classification Search
CPC ........ B60C 15/0233; B60C 7/00; B60C 7/10; B60C 7/14; B60C 7/143; B60C 7/146; B60C 7/22; B60C 7/24; B60C 7/26; B60B 25/02; B60B 25/04; B60B 9/00; B60B 9/02; B60B 9/10; B60B 9/14; B60B 3/04; B60B 3/041; B60B 3/042; B60B 3/044; B60B 3/045; B60B 23/00; B60B 23/04; Y10T 29/49494; Y10T 29/49499

USPC ............ 152/1, 5, 7, 40, 43, 44, 45, 46, 379.3, 152/385, 396, 399, 402; 301/9.1, 10.1, 301/11.1, 17, 18, 19; 29/894.322

See application file for complete search history.

(56) References Cited

U.S. PATENT DOCUMENTS

| | | | | |
|---|---|---|---|---|
| 632,378 | A * | 9/1899 | Stewart | 152/388 |
| 2,817,382 | A * | 12/1957 | Stewart | 152/385 |
| 3,329,192 | A * | 7/1967 | Roque | 152/327 |
| 8,714,217 | B2 * | 5/2014 | Chon et al. | 152/74 |
| 2003/0213538 | A1 * | 11/2003 | Russell | 152/44 |
| 2005/0000611 | A1 * | 1/2005 | Russell | 152/44 |
| 2008/0073014 | A1 * | 3/2008 | Abe | 152/378 R |
| 2011/0278911 | A1 * | 11/2011 | Funaki | 301/62 |

* cited by examiner

*Primary Examiner* — Kip T Kotter
(74) *Attorney, Agent, or Firm* — Hovey Williams LLP

(57) ABSTRACT

A wheel assembly includes a rigid wheel and an airless flexible tire with certain performance characteristics of a pneumatic tire. The rigid wheel includes a central portion and a plurality of circumferentially spaced mounting elements removably attached to a radially outer margin of the central portion. The tire is mounted on the wheel and engages the mounting elements such that portions of the tire not engaging the mounting elements are separated radially from the wheel by a space. The tire is configured such that portions of the tire not engaging the mounting elements flex inwardly toward the wheel when subject to ground engaging pressure, thereby minimizing ground penetration and soil disruption. The tire may include one or more tension elements embedded in the tire to increase the tire's strength and resilience.

20 Claims, 8 Drawing Sheets

WHEEL AND TIRE ASSEMBLY

BACKGROUND

1. Field

Embodiments of the present invention relate to wheel and tire assemblies for use with airless tires. More particularly, embodiments of the present invention relate to wheel assemblies with airless tires presenting certain performance characteristics of pneumatic tires.

2. Related Art

Irrigation systems include elevated water conduits supported by mobile towers. Such mobile towers are mounted on wheels that propel the towers along the ground to be irrigated. The wheels typically include pneumatic tires that require periodic maintenance, including adjusting air pressure, repairing tires that develop holes or other damage, and replacing old or damaged tires that are beyond repair.

Because irrigation systems and similar agricultural equipment are typically used in fields or other remote locations, monitoring the tires for problems and reaching the tires to perform maintenance and repairs can be inconvenient or difficult. If a tire loses air pressure and is not repaired in a timely manner, damage to the tire, to the equipment mounted on the tire, or both may result.

One solution to the challenges presented by the use of pneumatic tires involves using wheels without tires. While this approach addresses most of the problems of tire maintenance, repair and replacement, it presents other challenges. Tireless wheels, for example, are rigid and experience greater ground penetration than a flexible tire, thereby creating ruts or otherwise disturbing the land more than a pneumatic tire. Similar problems exist for tractors, automobiles, and other vehicles that typically use pneumatic tires.

Accordingly, there is a need for a solution which overcomes the limitations described above.

SUMMARY

Embodiments of the present invention solve the above-described problems by providing a wheel assembly including an airless tire with some performance characteristics of a pneumatic tire.

A wheel assembly in accordance with an embodiment of the invention broadly comprises a rigid wheel and a flexible airless tire. The rigid wheel includes a central portion and a plurality of circumferentially spaced mounting elements removably attached to a radially outer margin of the central portion. The tire is mounted on the wheel and engages the mounting elements such that portions of the tire not engaging the mounting elements are separated radially from the wheel by a space, the portions of the tire not engaging the mounting elements being configured to flex inwardly toward the wheel when subject to ground engaging pressure.

A method of assembling a wheel assembly in accordance with another embodiment of the invention comprises removably fastening a first plurality of mounting elements to a radially outer margin of a first axial side of a central portion of a wheel such that the mounting elements are spaced circumferentially around the central portion of the wheel. The wheel is placed in an airless tire such that each of the first plurality of mounting elements engages an inner surface of the airless tire. A second plurality of mounting elements are removably fastened to a radially outer margin of a second axial side of the central portion of the wheel such that each of the second plurality of mounting elements engages the inner surface of the airless tire. The second plurality of mounting elements are also spaced circumferentially around the central portion of the wheel.

A wheel assembly in accordance with yet another embodiment of the invention comprises a rigid wheel and an airless flexible tire mounted on the wheel. The wheel includes a disc shaped central portion with a plurality of circumferentially spaced flanges corresponding to a radially outer margin of the central portion. A pair of mounting elements is removably attached to each of the flanges such that each of the mounting element pairs includes a first mounting element removably attached to a first side of the flange and a second mounting element removably attached to a second side of the flange opposite the first side of the flange. The pair of mounting elements presents an elongated, transversely oriented radially outer edge.

The tire engages the outer edges of the mounting elements such that portions of the tire not engaging the mounting elements are separated radially from the wheel by a space. The portions of the tire not engaging the mounting elements are configured to flex inwardly toward the wheel when subject to ground engaging pressure. A tension element is embedded in the tire and extends longitudinally around the tire.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

Figure 1:
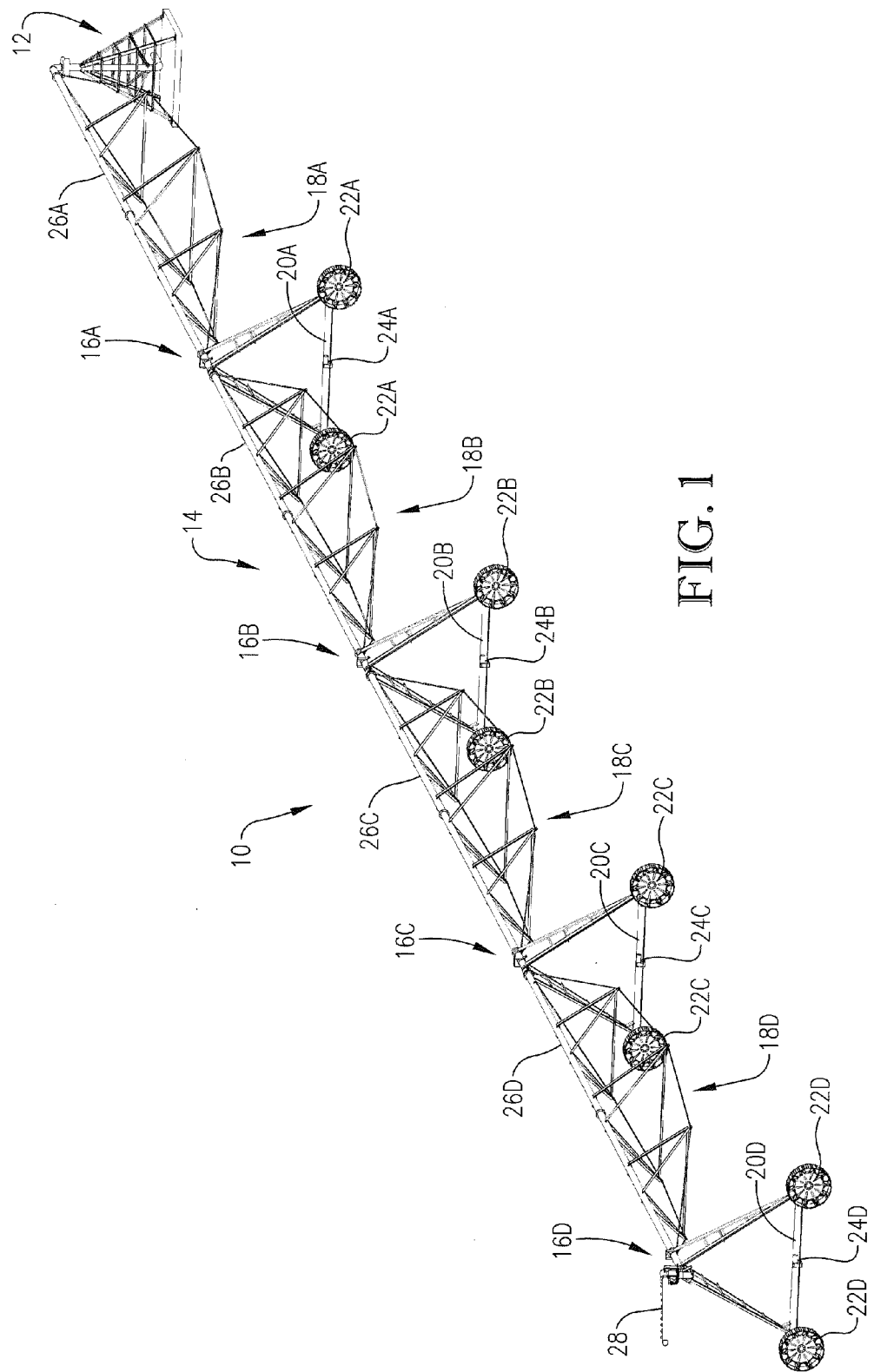
FIG. 1 is a perspective view of an exemplary irrigation system including wheel assemblies constructed in accordance with embodiments of the invention.
Figure 2:
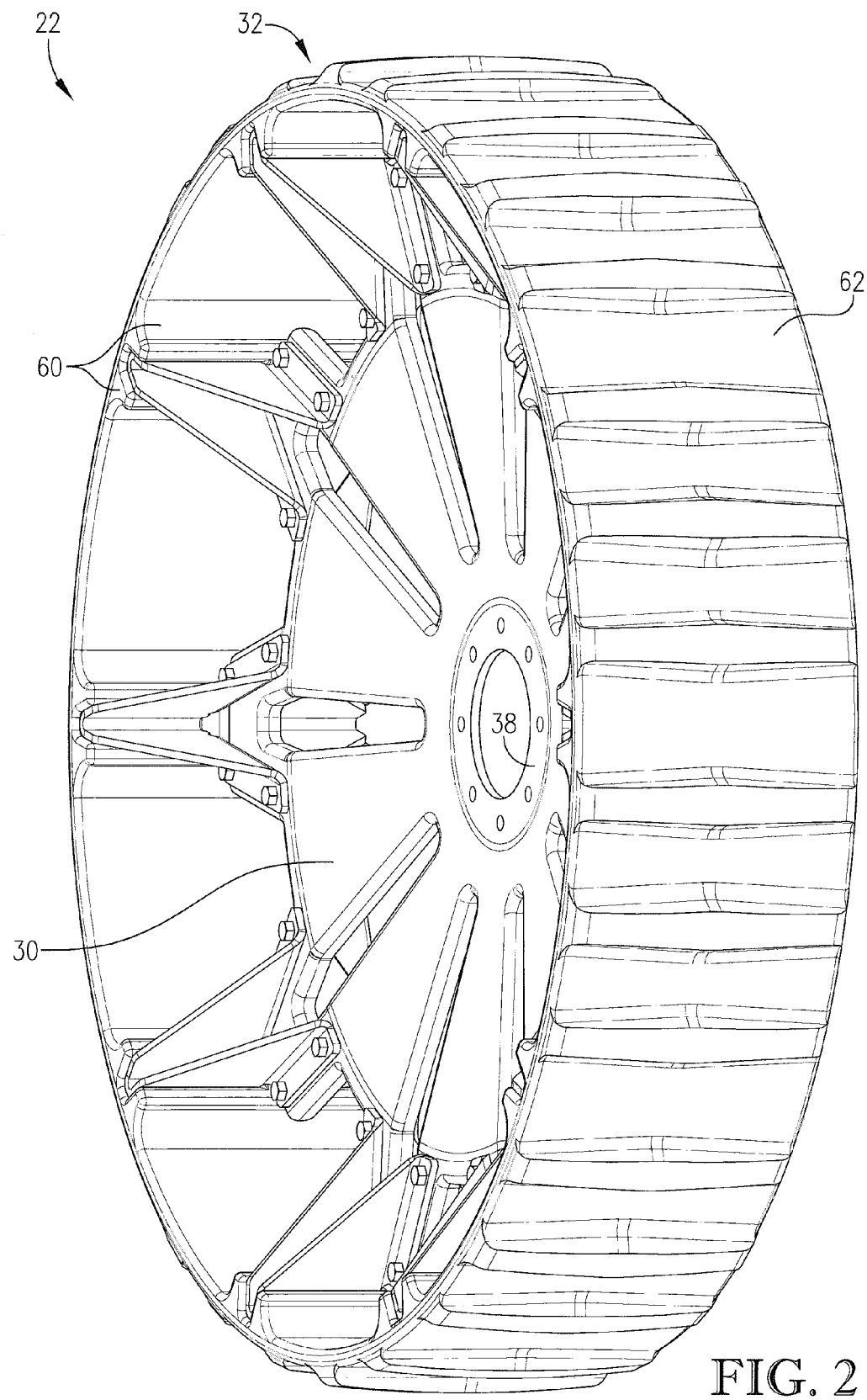
FIG. 2 is a front side perspective view of one of the wheel assemblies of FIG. 1, the wheel assembly including a rigid wheel and a flexible airless tire mounted on the wheel.
Figure 3:
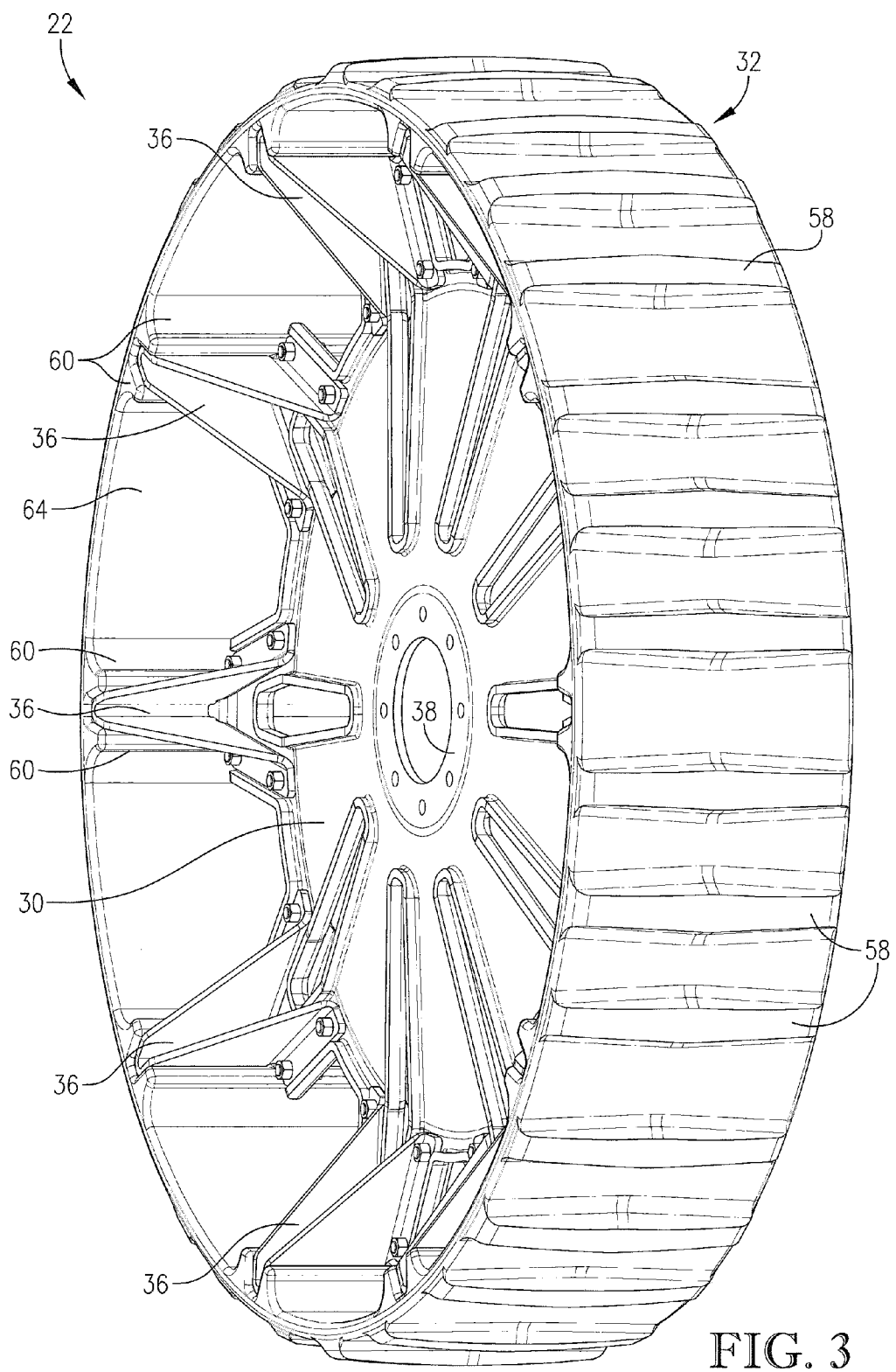
FIG. 3 is a rear side perspective view of the wheel assembly of FIG. 2.
Figure 4:
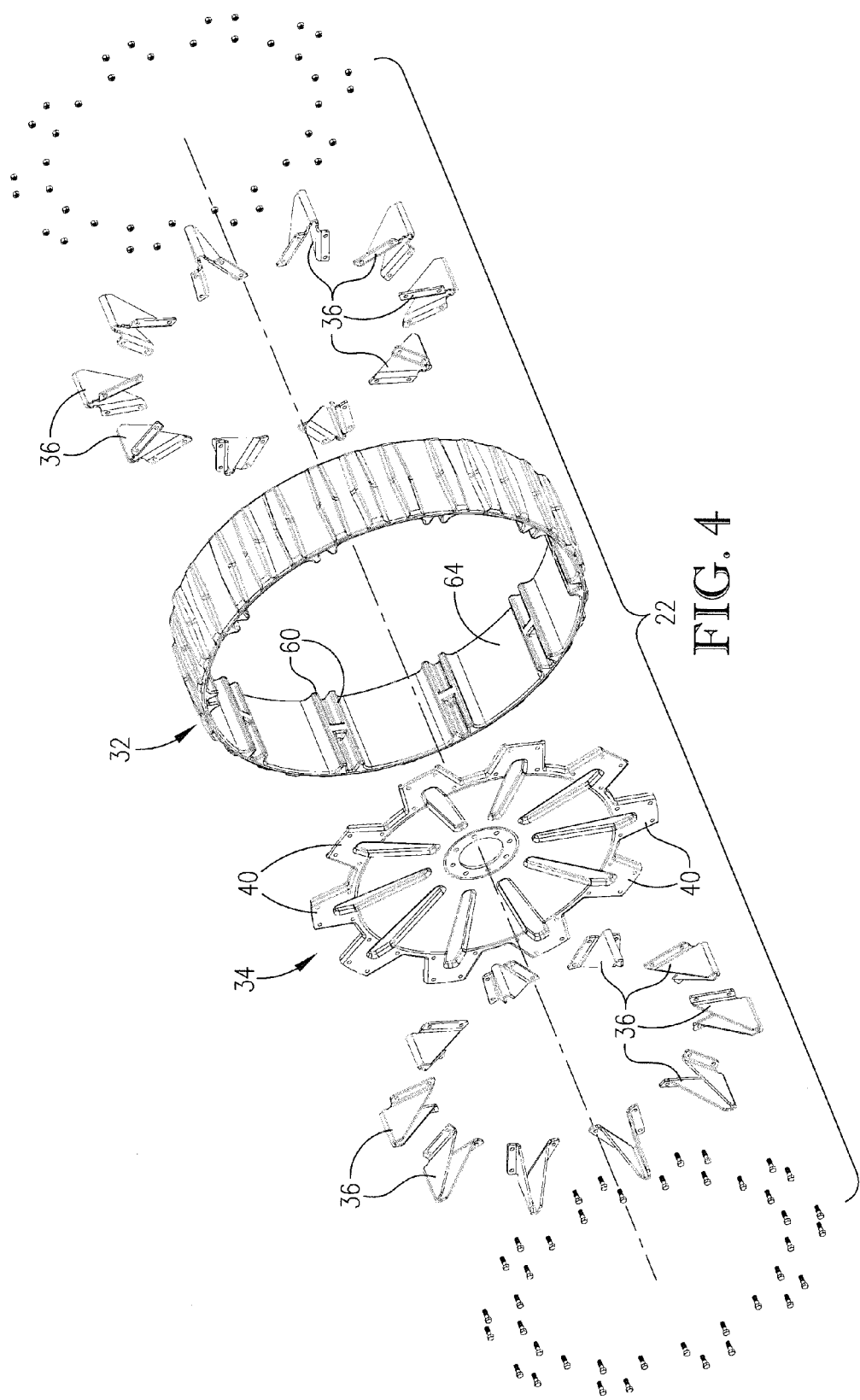
FIG. 4 is an exploded view of the wheel assembly of FIG. 2.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and initially FIG. 1, an exemplary irrigation system 10 is illustrated including a plurality of wheel assemblies constructed in accordance with embodiments of the invention. The illustrated irrigation system 10 is a central pivot irrigation system that broadly comprises a fixed central pivot 12 and a main section 14 pivotally connected to the central pivot 12. The irrigation system 10 may also comprise an extension arm (also commonly referred to as a "swing arm" or "corner arm") pivotally connected to the free end of the main section.

The fixed central pivot 12 may be a tower or any other support structure about which the main section 14 may pivot. The central pivot 12 has access to a well, water tank, or other source of water and may also be coupled with a tank or other source of agricultural products to inject fertilizers, pesticides and/or other chemicals into the water for application during irrigation.

The main section 14 may comprise a number of mobile support towers 16A-D, the outermost 16D of which is referred to herein as an "end tower". The support towers are connected to the fixed central pivot 12 and to one another by truss sections 18A-D or other supports to form a number of interconnected spans. The irrigation system 10 illustrated in FIG. 1 includes four mobile support towers 16A-D; however, it may comprise any number of mobile support towers without departing from the scope of the present invention.

Each mobile tower may include a drive tube 20A-D on which a pair of wheel assemblies 22A-D is mounted. Embodiments of the wheel assemblies 22A-D are described in more detail below. A drive motor 24A-D is mounted to each drive tube 20A-D for driving the wheel assemblies 22A-D. The motors 24A-D may include integral or external relays so they may be turned on, off, and reversed. The motors may also have several speeds or be equipped with variable speed drives.

Each of the truss sections 18A-D carries or otherwise supports a conduit section 26A-D or other fluid distribution mechanism that is connected in fluid communication with all other conduit sections. A plurality of sprinkler heads, spray guns, drop nozzles, or other fluid-emitting devices are spaced along the conduit sections 26A-D to apply water and/or other fluids to land underneath the irrigation system.

The irrigation system 10 may also include an optional extension arm (not shown) pivotally connected to the end tower 16D and supported by a swing tower with steerable wheels driven by a motor. The extension arm may be joined to the end tower by an articulating pivot joint. The extension arm is folded inward relative to the end tower when it is not irrigating a corner of a field and may be pivoted outwardly away from the end tower while irrigating the corners of a field.

The irrigation system 10 may also include one or more high pressure sprayers or end guns 28 mounted to, the end tower 16D or to the end of the extension arm. The end guns 28 may be activated at the corners of a field or other designated areas to increase the amount of land that can be irrigated.

It will be appreciated that the irrigation system 10 is illustrated and described herein as one exemplary implementation of the wheel assemblies 22 described in detail below. Other, equally preferred implementations of the wheel assemblies 22 not shown or discussed in detail herein may include, without limitation, other types of irrigation systems, such as lateral irrigation systems, other types of agricultural equipment, such as wagons, carts, implements, and so forth, or other types of vehicles such as buses, trucks, and automobiles. However, embodiments of the invention are especially suited for irrigation systems and other vehicles or systems that travel over un-paved or un-finished ground.

Figure 6:
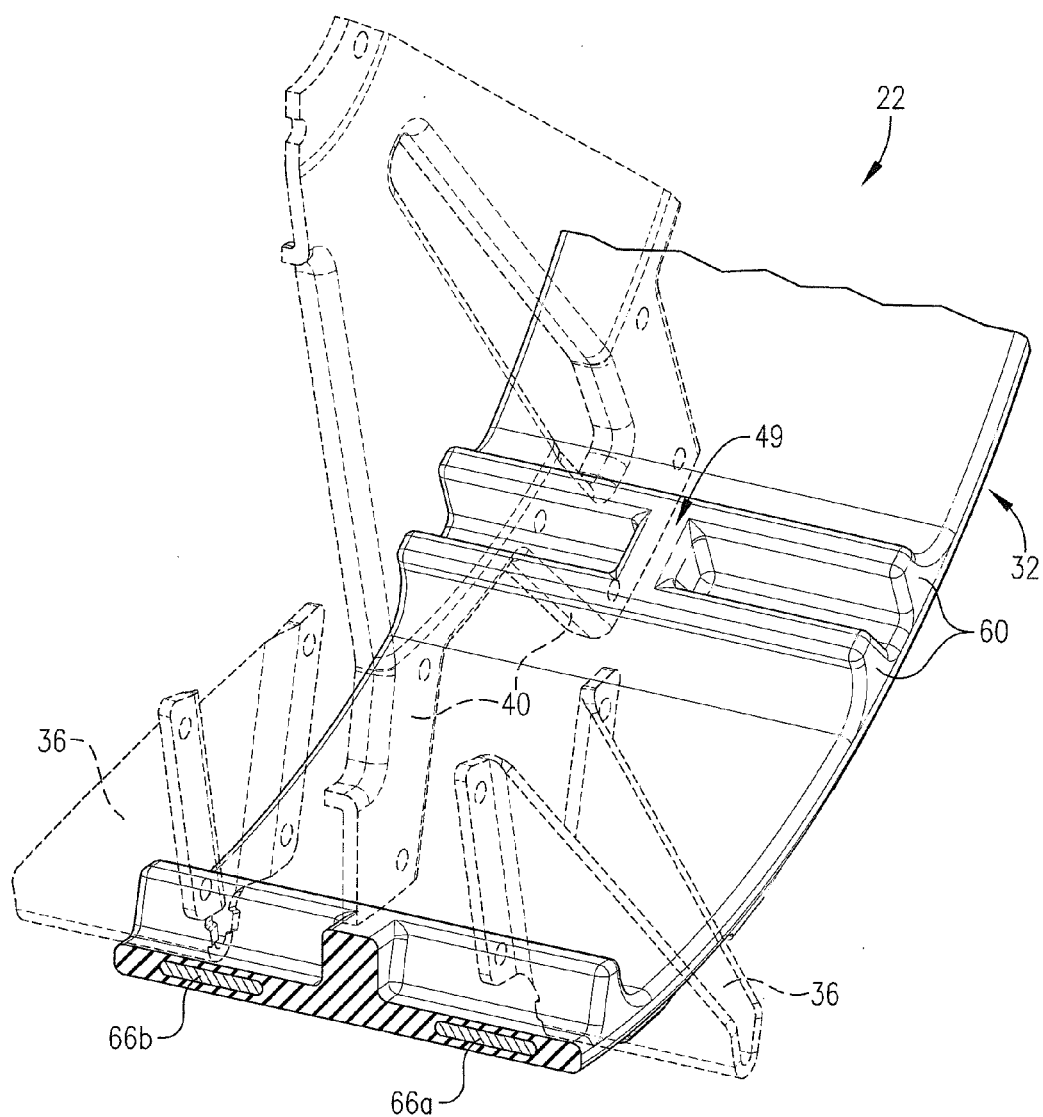
FIG. 6 is fragmentary partially exploded view of the wheel assembly of FIG. 2.
Figure 7:
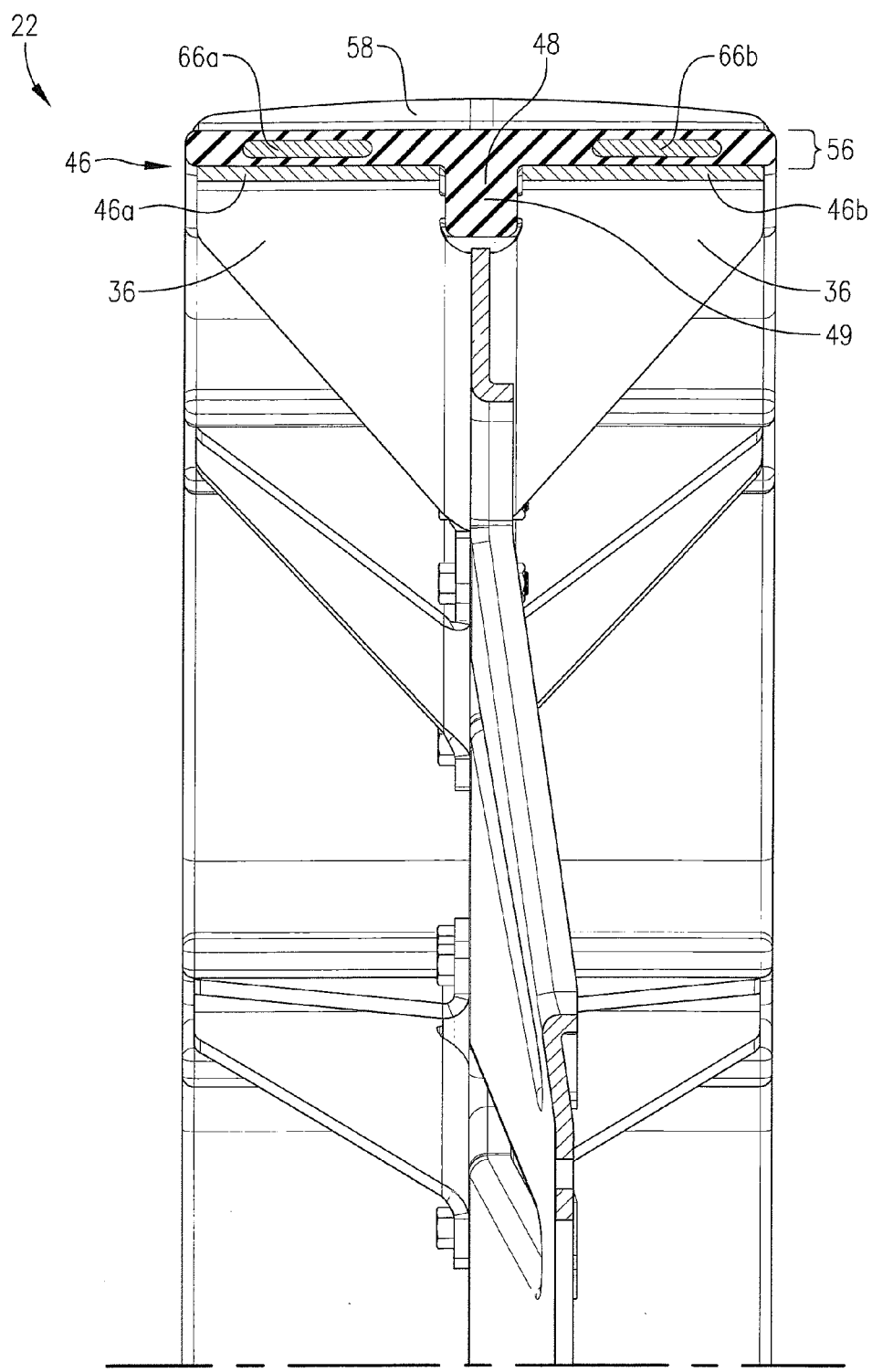
FIG. 7 is a fragmentary, cross-sectional view of the wheel assembly of FIG. 2.
Figure 8:
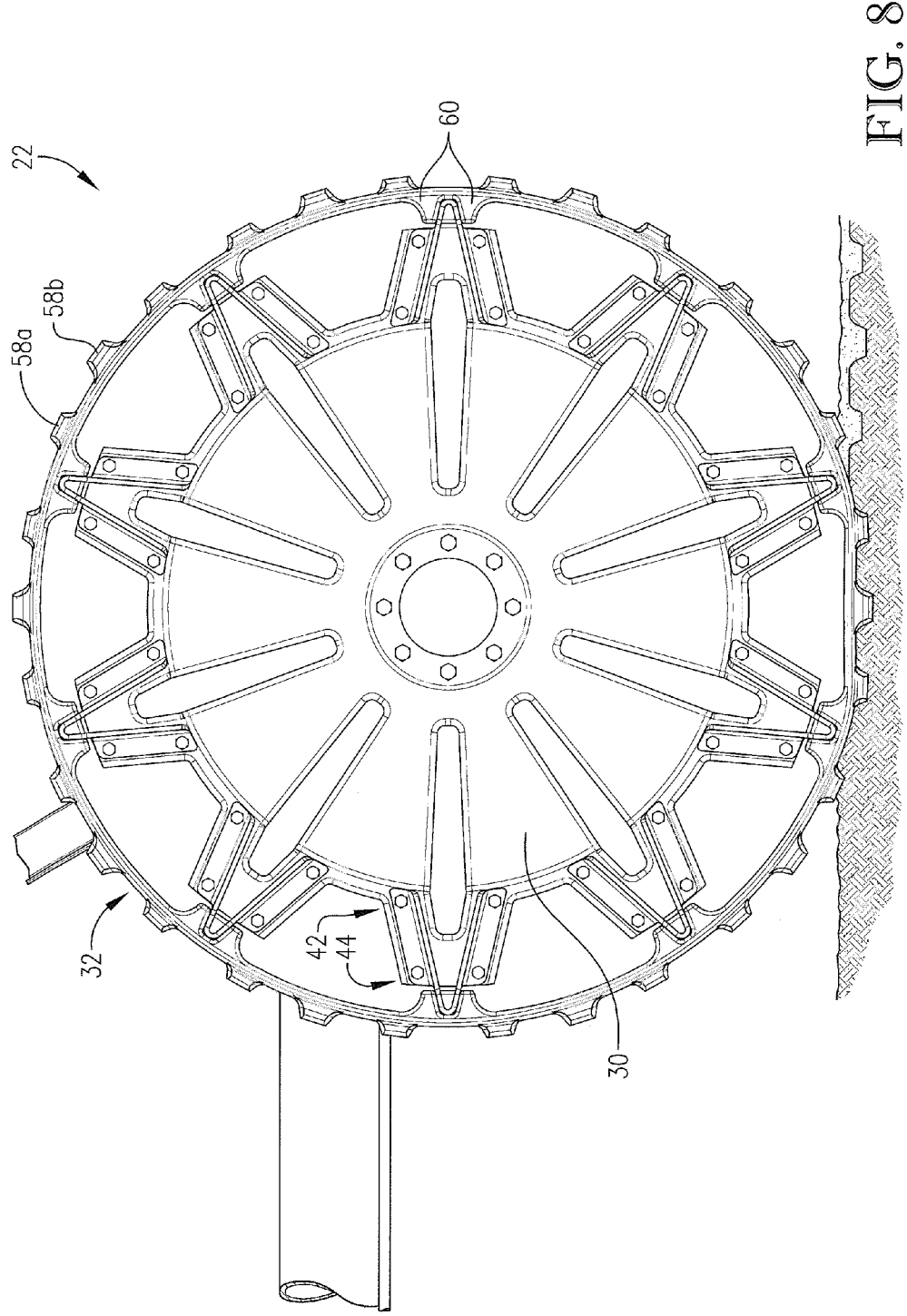
FIG. 8 is an environmental side elevation view of the wheel assembly of FIG. 2 illustrating the wheel assembly mounted on the irrigation system of FIG. 1 and engaging the ground.

Referring now to FIGS. 2-8, a wheel assembly 22 constructed in accordance with embodiments of the invention is illustrated. The wheel assembly 22 broadly includes a rigid wheel 30 and a flexible airless tire 32 mounted on the wheel 30 in a generally circumscribing relationship to the wheel 30. The wheel 30 and the tire 32 are configured such that the tire 32, while being airless, has some characteristics of a pneumatic tire that improve the performance of the tire. For example, the wheel 30 and tire 32 are configured such that portions of the tire 32 flex radially inwardly toward the wheel 30 in response to ground engaging pressure, as illustrated in FIG. 8. It will be appreciated that this flexing action increases the total ground engaging footprint of the wheel assembly 22, thus distributing the weight of the wheel assembly 22 and the weight of any machinery supported by the wheel assembly 22 over a larger area and limiting the total amount of ground penetration of the wheel assembly 22. Additionally, ground penetration of traction lugs or other ground-gripping elements of the tire 32 is limited, as explained below in greater detail.

As used herein, "ground engaging pressure" refers to pressure exerted on the wheel assembly 22 by the ground when the wheel assembly 22 is at rest on the ground or rolling on the ground. Ground engaging pressure may include pressure exerted on the wheel assembly 22 from different directions or from multiple directions simultaneously, such as where the wheel assembly 22 is on inclined terrain or rolling over an obstacle. Ground engaging pressure is related to the weight of the wheel assembly 22 and to the weight of any machinery supported by the wheel assembly 22, and thus will vary from one embodiment of the invention to another and from one implementation to another.

The wheel 30 is configured to engage the tire 32 at circumferentially spaced locations such that portions of the tire 32 between the points of engagement flex radially inwardly in response to ground engaging pressure. In the illustrated embodiment, the wheel 30 includes a disc shaped inner central portion 34 and a plurality of circumferentially spaced mounting elements 36 removably attached to a radially outer margin of the central portion 34. The central portion 34 of the wheel 30 includes an innermost hub 38 with a plurality of apertures for attaching to, for example, lug nuts or similar attachment components.

The radially outer margin of the central portion 34 of the wheel 30 defines a plurality of flanges 40 that extend radially outwardly and support the mounting elements 36, as explained below in greater detail. Each of the flanges 40 presents a trapezoidal shape that narrows from a broader inner portion 42 to a narrower outer portion 44. Each of the flanges 40 includes a plurality of apertures for use in securing the mounting elements 36 to the flanges 40. In the illustrated embodiment, the apertures are configured to receive bolts that secure the mounting elements 36 to the flanges 40. In the illustrated embodiment, the wheel 30 includes ten flanges 40 spaced circumferentially around the wheel 30.

A pair of mounting elements 36 is removably attached to each of the flanges 40. Each of the mounting element pairs includes a first mounting element 36 removably attached to a first side of the flange 40 and a second mounting element 36 removably attached to a second side of the flange 40 opposite the first side of the flange 40. When mounted on the flange 40, the pair of mounting elements 36 presents an elongated, transversely oriented radially outer edge 46 that extends radially beyond the flange 40 and engages the tire 32. As illustrated, the outer edge 46 comprises two segments, a first segment 46*a* corresponding to a first mounting element 36 and a first axial side of the outer edge 46, and a second segment 46*b* corresponding to a second mounting element 36 and a second axial side of the outer edge 46. The segments 46*a*, 46*b* may be separated to define a space 48 between the segments 46*a*, 46*b*, which engages a portion 49 of the tire 32 between the mounting elements 36 to prevent the tire 32 from shifting laterally relative to the wheel 30, as explained below.

As used herein, the mounting elements 36 are "removably attached" to the central portion 34 of the wheel 30 if the mounting elements 36 can be separated from the central portion 34 and reattached without altering or damaging the structure of the mounting elements 36 or the central portion 34 of the wheel 30. In the illustrated embodiment, the mounting elements 36 are removably attached to the central portion 34 of the wheel 30 using nut and bolt combinations that can be removed and replaced to remove and replace the mounting elements 36. By way of example, mounting elements that are integrally formed with, or welded to, the central portion 34 of the wheel 30 are not removably attached.

Each mounting element 36 includes a pair of mounting flanges 50*a,b*, an outer edge portion 52 and web portions 54*a,b* connecting the mounting flanges 50*a,b* with the outer edge portion 52. The mounting flanges 50*a,b* are each rectangular and correspond to side margins of the mounting element 36. Each of the mounting flanges 50*a,b* is flat, connected to one of the web portions 54*a,b* along a longitudinal edge of the flange 50*a,b*, and positioned at an angle of approximately ninety degrees relative to one of the web portions 54*a,b*. The first web portion 54*a* and the second web portion 54*b* are connected at the outer edge portion 52 and diverge from the outer edge portion 52 at an angle of approximately thirty degrees. Each web portion 54*a,b* presents a triangular shape.

Each mounting element 36 may be constructed of a single, unitary piece of material, such as metal, folded or otherwise formed to the desired shape and configuration. Furthermore, all of the mounting elements 36 may be identical in size and shape. By way of example, each of the mounting elements 36 may be constructed by cutting a piece of metal to a particular flat shape and then forming the piece of metal to the desired shape through a series of bending steps.

The mounting element 36 pairs are approximately equally spaced around the central portion 34 of the wheel 30 and extend radially outwardly from the central portion 34. When the tire 32 is mounted on the wheel 30 the mounting elements 36 engage portions of the tire 32 such that the tire 32 is separated radially from the central portion 34 of the wheel 30 by a space, allowing portions of the tire 32 to flex inwardly toward the central portion 34 in response to ground engaging pressure. As used herein, the mounting elements 36 extend radially outwardly from the central portion 34 if at least a portion of each of the mounting elements 36 extends radially outwardly from the central portion 34 of the wheel 30.

In the illustrated embodiment, the wheel assembly 22 includes ten mounting element pairs approximately equally spaced around the radially outer margin of the central portion 34 of the wheel 30. The mounting elements 36 are positioned on the wheel 30 such that each mounting element pair defines an elongated radially outer edge 46 that is oriented transversely on the wheel 30, that is, oriented parallel with the axis of rotation of the wheel assembly 22. The mounting element 36 pairs engage the tire and the total transverse length of each of the outer edges 46 is approximately equal to a width of the tire 32.

If the wheel 30 includes ten mounting element 36 pairs (as illustrated), the angular separation of the mounting element 36 pairs is approximately thirty-six degrees. Thus, if the wheel 30 is about forty-eight inches in diameter, the mounting element 36 pairs are spaced approximately twelve and one-half inches apart. If the wheel 30 is about fifty inches in diameter, the mounting element 36 pairs are spaced approximately thirteen inches apart. If the wheel 30 is about twenty-four inches in diameter, the mounting element 36 pairs are spaced approximately six inches apart.

The tire 32 is configured to be mounted on the wheel 30 such that at least a portion of the tire 32 engages the mounting elements 36 and the tire 32 presents a generally circular or nearly circular outer profile. Advantageously, the wheel 30 is configured for use with an airless tire. As used herein, a "tire" is a flexible component positioned and configured to engage the ground during use of the wheel assembly 22. An "airless tire" is a tire that does not require trapped or compressed air for normal and proper use. An airless tire may be constructed of a single, unitary piece of material or multiple pieces of material. As explained above and illustrated in FIG. 8, the tire 32 is configured to flex inwardly in response to ground engaging pressure. As used herein, the tire 32 can "flex" if it can deflect or bend repeatedly and return to its original shape.

The illustrated tire 32 includes a body 56 that is generally cylindrical in shape with a plurality of traction lugs 58 extending radially outwardly from an outer side of the body 56 and a plurality of drive lugs 60 extending radially inwardly from an inner side of the body 56. In the illustrated embodiment, the outer side 62 of the tire body 56 is generally transversely flat, that is, the outer side of the body presents little or no curvature from a first edge to a second edge of the tire. Similarly, the inner side 64 of the tire body 56 is also generally transversely flat.

The traction lugs 58 engage the ground and help prevent the wheel assembly 22 from slipping relative to the ground. The illustrated traction lugs 58 are generally rectangular in shape and transversely oriented on the tire 32, are integrally formed with the tire 32 and may be approximately equally spaced circumferentially around the outer side 62 of the tire body 56. As illustrated in FIG. 8, the tire 32 may be configured such that the traction lugs 58 are positioned intermediate the mounting elements 36. This configuration allows the portion of the tire 32 bearing the traction lug 58 to flex inwardly in response to ground engaging pressure. This performance characteristic allows each traction lug 58 to engage the ground, yet limits the amount of ground penetration and soil disturbance. It may be desirable in some implementations to position the traction lugs 58 proximate or in direct radial alignment with the mounting elements 36. Such alternative configurations of the tire 32 are within the ambit of the present invention.

As illustrated in FIG. 8, certain traction lugs 58b may be larger (i.e., have a greater radial reach) than other traction lugs 58a. In the illustrated embodiment, one of every three traction lugs has a greater radial reach, corresponding to a position that is approximately half the distance between consecutive mounting element 36 pairs. Thus, there are three traction lugs between consecutive mounting element 36 pairs, with the middle traction lug being larger than the other two.

The drive lugs 60 engage the wheel 30 and prevent the tire 32 from shifting longitudinally or laterally on the wheel 30. In the illustrated embodiment, the drive lugs 60 are arranged in pairs corresponding to the mounting elements 36 such that the drive lugs 60 are adjacent the mounting elements 36 on opposite sides of the mounting elements 36. Each of the drive lugs 60 is integrally formed in the tire 32 and presents a generally elongated body with a cross member (portion 49 of the tire 32) connecting each drive lug 60 pair. Each of the cross members is located at a center of the tire 32 and corresponds to the space 48 between mounting elements 36.

Figure 5:
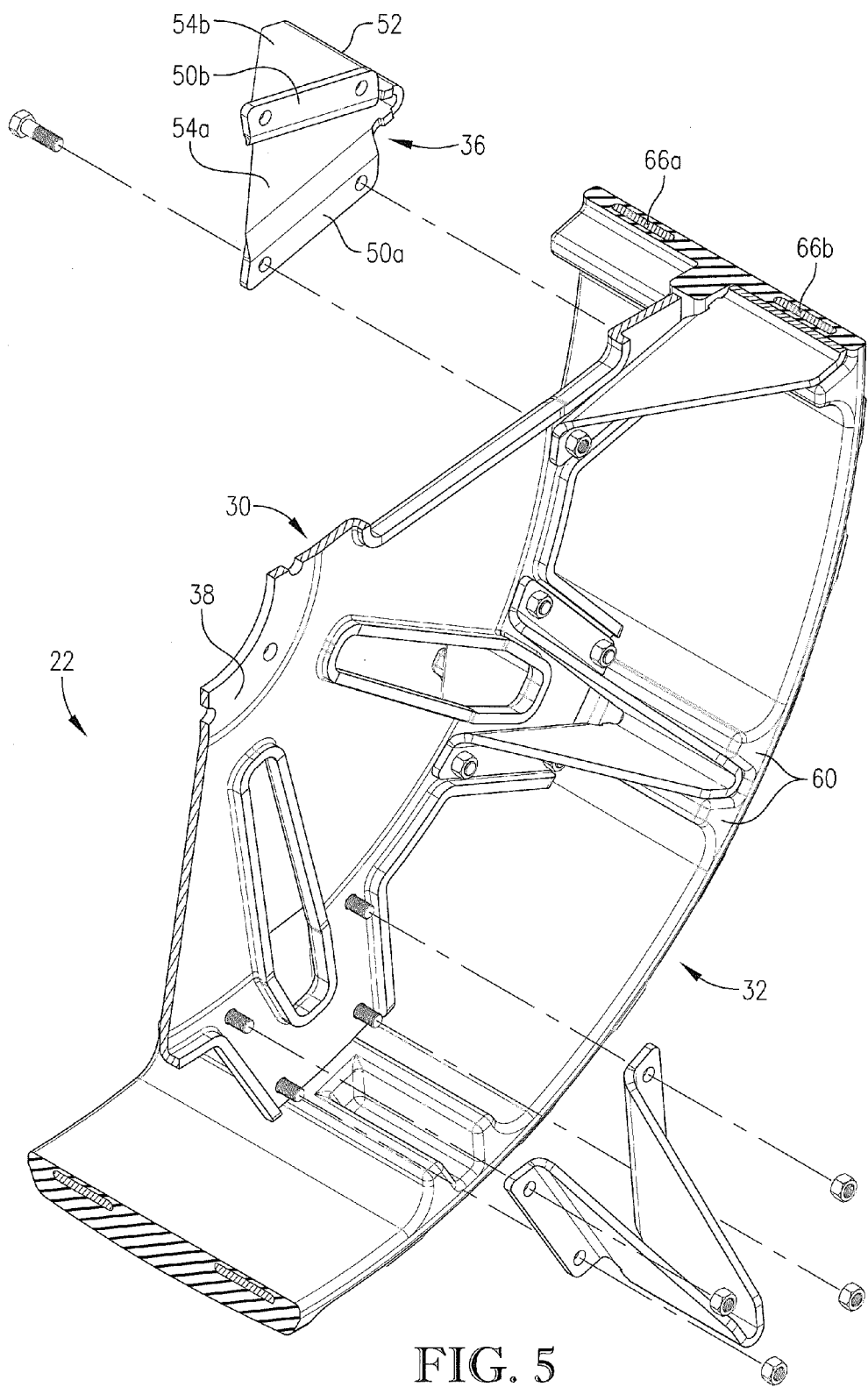
FIG. 5 is a fragmentary partially exploded view of the wheel assembly of FIG. 2.

The tire 32 is constructed of a flexible material, such as rubber, PVC or plastic. The tire 32 may be configured such that as the tire flexes inwardly toward the wheel 30, the flexed portion of the tire 32 remains transversely flat or substantially transversely flat. This may be desirable, for example, to preserve a wide footprint or otherwise limit the amount of ground penetration. With particular reference to FIGS. 5-7, one or more tension elements 66a,b may be secured to the tire 32 to give the tire 32 added structural strength and resilience. As used herein, a tension element 66a,b is "secured to" the tire 32 if it is partially or completely embedded in the tire 32 or otherwise attached to the tire 32. A first tension element 66a may be placed in a first axial side of the tire body 56 and a second tension element 66b may be placed in a second axial side of the tire body 56. Alternatively, a single tension element may be located in a central portion of the tire 32. The tension elements 66a,b are preferably completely embedded in the tire 32, as illustrated.

The tension elements 66a,b are preferably more resilient than the material used to construct the tire 32 such that the one or more tension elements 66a,b increase the overall resilience of the tire 32, strengthening the structure of the tire 32 and enabling the tire 32 to return to its original shape after being subject to deflection during use. The one or more tension elements 66a,b may be constructed of metal, such as spring steel, or other resilient and durable material. More particularly, each of the tension elements 66a,b may be a metal band constructed of a solid piece of metal or of multiple bonded or braided metal elements. The tension elements 66a,b may present a width that is between 0.05 and 0.5 times a total width of the tire, such as 0.1, 0.2 or 0.3 times the total width of the tire. If the tire 32 is twelve inches wide, for example, each of the tension elements 66a,b may be about two or two and one-half inches wide and between one-eighth and one-half of an inch thick.

The wheel 30 is constructed of a rigid material such as, for example, metal, plastic or a composite material. The size of the wheel assembly 22 may vary substantially from one embodiment of the invention to another without departing from the scope of the invention. Dimensions and ranges of various preferred embodiments will now be discussed with the understanding that the dimensions and ranges are exemplary, and not limiting, in nature. The diameter of the wheel 30 is preferably within the range of from about twenty-four inches to about sixty inches and more preferably within the range of from about thirty-six inches to about forty-eight inches. The width of the wheel 30 (i.e., the total width of each of the mounting element pairs) is preferably within the range of from about six inches to about eighteen inches and more preferably within the range of from about eight inches to about sixteen inches. The diameter of central portion 34 of the wheel 30 is preferably between about 0.6 and 0.9 times the total diameter and may particularly be about 0.8 times the total diameter.

The height of the flanges 40 (i.e., the distance from the inner portion 42 to the outer portion 44) is preferably within the range of from about three inches to about seven inches, more preferably within the range of from about four inches to about six inches, and may particularly be about five inches. The length of the inner portion 42 of each flange 40 is preferably within the range of from about five inches to about ten inches, more preferably within the range of from about six inches to about nine inches, and may be about seven inches, about seven and one-half inches, or about eight inches. The length of the outer portion 44 of each flange 40 is preferably within the range of from about two inches to about seven inches, more preferably within the range of from about three inches to about six inches, and may be about four inches, about four and one-half inches, or about five inches.

The thickness of the tire body 56 is preferably within the range of from about one-half inch to about three inches, more preferably within the range of from about one inch to about two inches. The height of the traction lugs 58 is preferably within the range of from about one-quarter inch to about four inches, more preferably within the range of from about one-half inch to about three inches. In one exemplary embodiment, the wheel assembly 22 is about eleven inches wide and about fifty-two inches in diameter. The tire body preferably presents a width to thickness ratio of between five and twenty.

Although the invention has been described with reference to the exemplary embodiments illustrated in the attached drawings, it is noted that equivalents may be employed and substitutions made herein without departing from the scope of the invention as recited in the claims. For example, while the embodiment of the invention illustrated and described above includes ten pairs of mounting elements 36, a different number of mounting element 36 pairs may be used without departing from the scope of the invention. Additionally, the particular structure and configuration of each of the mounting elements 36 may vary from one embodiment of the invention to another without departing from the scope of the invention.

Having thus described various embodiments of the invention, what is claimed as new and desired to be protected by Letters Patent includes the following:

1. A wheel assembly comprising:
   a rigid wheel including—
     a central portion, and
     a plurality of circumferentially spaced rigid mounting elements removably attached to a radially outer margin of the central portion; and
   an airless flexible tire mounted on the wheel, the airless flexible tire including a plurality of drive lug pairs, each pair of drive lugs being positioned to engage opposite sides of one of the mounting elements, the drive lugs extending radially inwardly from the tire, portions of the tire extending annularly between the mounting elements and not engaging the mounting elements being completely separated radially from the wheel by a through-space transversely extending entirely from a first axial side of the tire to an opposite axial side of the tire, the portions of the tire not engaging the mounting elements being configured to flex radially inwardly toward the wheel when subject to ground engaging pressure.

2. The wheel assembly of claim 1, the plurality of mounting elements including a plurality of mounting element pairs, each mounting element pair including a first mounting element removably attached to a first side of the central portion of the wheel and a second mounting element removably attached to a second side of the central portion of the wheel opposite the first mounting element.

3. The wheel assembly of claim 2, each pair of mounting elements presenting an elongated, transversely oriented outer edge that engages the tire.

4. The wheel assembly of claim 3, a first axial side of the outer edge corresponding to the first mounting element, a second axial side of the outer edge corresponding to the second mounting element and being separated from the first axial side by a space, the tire including a radially inwardly-extending flange positioned between the first and second sides of the outer edge.

5. The wheel assembly of claim 1, the central portion of the wheel being constructed of a single, unitary piece of material.

6. The wheel assembly of claim 1, the tire including a plurality of traction lugs extending radially outwardly from the tire.

7. The wheel assembly of claim 6, wherein the traction lugs are positioned annularly intermediate the mounting elements.

8. The wheel assembly of claim 1, the tire including a cylindrically-shaped body with a substantially transversely flat outer side, the tire body presenting a width to thickness ratio of between five and twenty.

9. The wheel assembly of claim 1, the tire including a cylindrically-shaped body with a substantially transversely flat outer side, the tire body being between one-half inch and three inches thick and between six inches and eighteen inches wide.

10. The wheel assembly of claim 1, wherein the airless flexible tire further includes one or more tension elements at least partially embedded therein.

11. The wheel assembly of claim 1, wherein each mounting element is formed from a flat piece of metal shaped via a series of bending steps.

12. A method of assembling a wheel assembly, the method comprising:
removably fastening a first plurality of rigid mounting elements to a radially outer margin of a first axial side of a wheel, the mounting elements being spaced circumferentially around the wheel, each of the mounting elements being constructed of a single, unitary piece of material and being identical to all of the other mounting elements;
placing the wheel in an airless tire such that each of the first plurality of mounting elements engages an inner surface of the airless tire; and
removably fastening a second plurality of mounting elements to a radially outer margin of a second axial side of the wheel such that each of the second plurality of mounting elements engages the inner surface of the airless tire, the second plurality of mounting elements being spaced circumferentially around the wheel,
portions of the tire positioned annularly between the mounting elements and not engaging the mounting elements being completely separated radially from the wheel by a through-space transversely extending entirely from a first axial side of the tire to an opposite axial side of the tire,
the portions of the tire not engaging the mounting elements being configured to flex radially inwardly toward the wheel when subject to ground engaging pressure.

13. The method of claim 12, the second plurality of mounting elements being fastened to the wheel such that an elongated outer edge of each of the second plurality of mounting elements aligns with an outer edge of one of the first plurality of mounting elements.

14. The method of claim 12, the tire including a cylindrically-shaped body with a substantially transversely flat outer side, the tire body presenting a width to thickness ratio of between five and twenty.

15. The method of claim 12, the tire including a cylindrically-shaped body with a substantially transversely flat outer side, the tire body being between one-half inch and three inches thick and between six inches and eighteen inches wide.

16. A wheel assembly comprising:
a rigid wheel including—
a disc shaped central portion including a plurality of rigid circumferentially spaced flanges corresponding to a radially outer margin of the disc shaped central portion, and
a pair of rigid mounting elements removably attached to each of the flanges, each of the mounting element pairs including a first mounting element removably attached to a first side of the flange and a second mounting element removably attached to a second side of the flange opposite the first side of the flange, the pair of mounting elements presenting an elongated, transversely oriented radially outer edge, a first axial side of each outer edge corresponding to a first mounting element of the pair of mounting elements, a second axial side of the outer edge corresponding to a second mounting element of the pair of mounting elements, the second axial side of the outer edge being separated from the first axial side by a space, the tire including a radially inwardly-extending flange positioned between the first and second sides of the outer edge; and
an airless flexible tire mounted on the wheel and engaging the outer edges of the mounting elements such that portions of the tire extending annularly between the mounting elements and not engaging the mounting elements are completely separated radially from the wheel by a through-space transversely extending entirely from a first axial side of the tire to an opposite axial side of the tire, the portions of the tire not engaging the mounting elements being configured to flex radially inwardly toward the wheel when subject to ground engaging pressure, the tire including a tension element embedded in the tire and extending longitudinally around the tire.

17. The wheel assembly of claim 16, the tire including a cylindrically-shaped body with a substantially transversely flat outer side, the tire body presenting a width to thickness ratio of between five and twenty.

18. The wheel assembly of claim 16, the tire including a cylindrically-shaped body with a substantially transversely flat outer side, the tire body being between one-half inch and three inches thick and between six inches and eighteen inches wide.

19. The wheel assembly of claim 16, the tension element including a metal band.

20. The wheel assembly of claim 16,
the central portion of the wheel being constructed of a single, unitary piece of material, and
each of the mounting elements being constructed of a single, unitary piece of material and being identical to all of the other mounting elements.

\* \* \* \* \*